United States Patent

[11] 3,607,897

[72] Inventor  Keith W. Michael
              Midland, Mich.
[21] Appl. No. 800,715
[22] Filed     Feb. 19, 1969
[45] Patented  Sept. 21, 1971
[73] Assignee  Dow Corning Corporation
              Midland, Mich.

[54] PREPARATION OF MONOHYDROCHLOROSILANES II
     2 Claims, No Drawings

[52] U.S. Cl. .................................................. 260/448.2 E,
                                                    260/448.2 H
[51] Int. Cl. ............................................... C07f 7/08,
                                                    C07f 7/12
[50] Field of Search .......................................... 260/448.2
                                                    E, 448.2 H

[56]                References Cited
              UNITED STATES PATENTS

| Re. 25,179 | 5/1962  | Ziegler et al. | 260/448.2 E X |
| 2,857,414  | 10/1958 | Schmidt et al. | 260/448.2 E   |
| 3,496,206  | 2/1970  | Berger         | 260/448.2 E   |
| 3,499,020  | 3/1970  | Robinson       | 260/448.2 E   |

Primary Examiner—Tobias E. Levow
Assistant Examiner—P. F. Shaver
Attorneys—Robert F. Fleming, Jr., Laurence R. Hobey and Harry D. Dingman ABSTRACT: Chlorosilanes of the formula $R_xSiHCl_{3ib-x}$ are prepared by reacting $R_xSi(OR')Cl_{3i-x}$ with dialkyl aluminum hydrides at a temperature from $-40°$ to $25°$ C. and thereafter separating the desired product from the reaction mixture at a temperature not exceeding $25°$ C.

PREPARATION OF MONOHYDROCHLOROSILANES II

It is known from U.S. Pat. No. 2,857,414, that halosilanes and alkoxysilanes can be reacted with dialkyl aluminum hydrides to produce silanes having the SiH group. This patent shows that where sufficient hydrogen is present to react with all of the halo or alkoxy groups on the silicon, the products obtained are those having one hydrogen on the silicon for every halo or alkoxy group. The patent also shows that the reaction occurs at temperatures from 20° to 260° C., and the reaction is exothermic. No attempt is made in accordance with the patent to control the temperature during the reaction. Furthermore, the patent makes no distinction between the activity of halogen on silicon and alkoxy on silicon.

Essentially the same reaction is described in French Pat. No. 1,499,032 published Oct. 20, 1967. In addition, this patent teaches that the reduction of the halo or alkoxysilanes can be accelerated by the use of ethers such as tetrahydrofuran. However, there is no showing in the French patent that there is any difference in the rate of reduction as between alkoxy and halogen atoms on Si. Furthermore, the patent teaches in example 6 that the reaction of 0.1 mol of diphenldich and 0.1 mol of diisobutyl aluminum hydride in tetrahydrofuran as a solvent produces 0.042 mol of diphenylsilane and only 0.006 mols of diphenylchlorosilane. Thus, the patent teaches that one cannot obtain significant yields of $R_2SiHCl$ compounds by merely using one-half the amount of A1H needed to reduce the total amount of chlorine in $R_2SiHCl_2$ It would certainly be expected from the patent that $R_2Si(OR')BQ2$ would behave the same since alkoxy and halogen are made equivalent.

It is generally known in the art that silicon-bonded halogen is far more reactive than silicon-bonded alkoxy groups toward organometallic compounds, in general. For example, Eaborn, "Organosilicon Compounds," pages 12 and 30 shows that Grignard reagents and sodium alkyls will react with chloroalkoxysilanes to replace the chlorine in preference to the alkoxy group. Thus, dichlorodiethoxysilane can be reacted with a methyl Grignard reagent to produce the dimethyldiethoxysilane. The publication also shows on page 32, that alkyl aluminum compounds, in general will react with halosilanes to establish SiC bonds and thereby teaches the equivalence of aluminum alkyls to Grignard reagents and alkali metal alkyls. This is also shown in U.S. Pat. No. 2,403,370.

It is further shown on page 197 of Eaborn, that lithium hydride will react with diethyldichlorosilane or diethyldiethoxysilane to produce diethylsilane. This is the teaching that the metal hydrides react, in general, according to the way in which organometallic compounds react.

On the bases of these teachings one would expect that in a competitive reaction between a halogen on silicon and an alkoxy group on silicon with respect to aluminum hydrides that the halogen would be preferentially replaced by hydrogen. There is nothing in U.S. Pat. No. 2,857,414 or French Pat. No. 1,499,032, to rebut this presumption. It is therefore most unexpected that applicant has found under the conditions hereinafter shown the alkoxy group is preferentially replaced with respect to halogen atom.

It is the object of this invention to provide a commercially feasible method of preparing silanes having one hydrogen and one or two chlorine atoms per molecule.

This invention relates to a method of preparing silanes of the formula $R_xSiHCl_{3-x}$ which comprises (A) reacting at a temperature not more than 25° C., (1) a silane of the formula $R_xSi(OR')Cl_{3-x}$ with (2) R"AlH in amount of about 1 mol or less of A1H per mol of SiOR' and (B) thereafter separating the silane so produced from the reaction mixture while maintaining the temperature of said mixture at no more than 25° C. during said separation, in above compounds, R is an aliphatic hydrocarbon radical of less than six carbon atoms, R' is methyl or ethyl, R" is an alkyl radical of no more than 10 carbon atoms and $x$ is an integer from 1 to 2.

In carrying out the process of this invention it is critical that the temperature be maintained at or below about 25° C. at all times. Inasmuch as the reaction of the aluminum hydrides with the alkoxysilane is exothermic it is essential that the reaction mixture be cooled during the reaction in order to maintain the desired temperatures. If temperatures are allowed to rise above 25° C. either none of the desired compounds are obtained or the yield is very low. The same is true when a separation is attempted at temperatures above 25° C. There is no critical lower limit to the reaction temperature, but it has been found that there is no advantage operating below −40° C.

In the process of this invention the starting silanes are those in which R is an aliphatic hydrocarbon radical of less than six carbon atoms such as methyl, ethyl, isopropyl, pentyl, vinyl, allyl or butenyl and the alkoxy group must be either methoxy or ethoxy. The methoxy is preferred.

Silanes having both alkoxy and halogen atoms on the same silicon atom are known compounds and can best be prepared by the alkoxy-halogen exchange reaction between say dimethyldichlorosilane and dimethyldimethoxysilane. When such a mixture is heated rearrangement occurs to produce dimethylmethoxychlorosilane. The alkoxysilanes can also be prepared by the partial alkoxalation of the corresponding chlorosilane which is brought about by reacting the chlorosilanes with less than the stoichometric amount of an alcohol.

The alkyl aluminum hydrides employed herein are well-known compounds of commerce.

The separation of the desired silanes from the reaction mixture must be carried out at a temperature not exceeding 25° C. This separation can be carried out at any desired manner, but the most feasible one is by distillation at reduced pressure.

The silanes prepared by the method of this invention are useful in the preparation of organosilicon polymers, rubbers and resins.

The following examples are illustrative only and should not be construed as limiting the invention which is properly delineated in the appended claims.

EXAMPLE 1

This example shows the critical effect of temperature on the yield of the desired dimethyl chlorosilane. The yield of the product is based on the starting amount of dimethyl chloro methoxy silane. In each case dimethyl chloro methoxy silane was reacted with diisobutyl aluminum hydride at the temperature shown. The other products, if any, were dimethylsilane and unreacted dimethy)chloro methoxy silane.

| Temperature | % Yield of dimethyl chlorosilane |
| --- | --- |
| 80° C. | 0 |
| 25–30° C. | 50 |
| 25° C. | 81 |
| −23° C. | 83 |

In order to maintain these yields the product must be separated from the reaction mixture at reduced pressure at a temperature not exceeding 25° C.

It can be seen that as soon as the temperature exceeds 25° C. there is a rapid fall-off in the yield of the desired dimethyl monochlorosilane, so that at a temperature of 80° C. none of the desired product is obtained. Rather one obtains the dimethylsilane which is the product expected from the aforesaid U.S. Patent.

EXAMPLE 2

Equivalent results are obtained when the following silanes are reacted at 10° C. with diethyl aluminum hydride or with decyl propyl aluminum hydride.

SILANE PRODUCT

| | |
| --- | --- |
| diethyl methoxy chlorosilane | diethylchlorosilane |
| isopropyl dichloro methoxy silane | isopropyldichlorosilane |
| dibutyl ethoxy chlorosilane | dibutyl chlorosilane |
| vinyl methoxy dichlorosilane | vinyl dichlorosilane |

That which is claimed is:
1. A method of preparing silanes of the formula $R_xSiHCl_{3-x}$ which comprises
   A. reacting at a temperature of not more than 25° C.,
      1. a silane of the formula $R_xSi(OR')Cl_{3-x}$ with
      2. $R''_2AlH$ in amount of about 1 mol or less of AlH per mol of SiOR' and
   B. thereafter separating the silanes so produced from the reaction mixture while maintaining the temperature of said mixture at no more than 25° C. during said separation, in the above compounds
   R is an aliphatic hydrocarbon radical of less than six carbon atoms,
   R' is methyl or ethyl,
   R'' is an alkyl radical of no more than 10 carbon atoms and $x$ is an integer from 1 to 2.

2. The method in accordance with claim 1 in which (1) is dimethyl methoxy chlorosilane and (2) is diisobutyl aluminum hydride.

UNITED STATES PATENT OFFICE
CERTIFICATE OF CORRECTION

Patent No. 3,607,897                              Dated September 21, 1971

Inventor(s)    Keith W. Michael

It is certified that error appears in the above-identified patent and that said Letters Patent are hereby corrected as shown below:

In the Abstract, line 1, the formula " $R_XSiHCl_{31bx}$ " should read $R_XSiHCl_{3-x}$ --; line 2, the formula " $R_XSi(OR')Cl_{31X}$ " should read -- $R_XSi(OR')Cl_{3-x}$ --.

Column 1, line 22, "dich" should read --dichlorosilane--; line 27, "A1H" as printed, should read --AlH--, where the middle character is the letter "el" and not the numeral "1"; line 28, the formula " $R_2SiHCl_2$ " should read -- $R_2SiCl_2$ --; line 29, the formula " $R_2Si(OR')BQ2$ " should read -- $R_2Si(OR')_2$ --; line 63, the formula " $R_XSiHCl_{31X}$ " should read -- $R_XSiHCl_{3-x}$ --; line 65, the formula " $R_XSi(OR')Cl_{31X}$ " should read -- $R_XSi(OR')Cl_{3-x}$ --; line 66, "A1H" as printed, should read --AlH--, where the middle character is the letter "el" and not the numeral "1".

Column 2, line 45, "dimethy)chloro" should read --dimethylchloro--.

Column 3, line 6, the formula " $R_XSiHCl_{31x}$ " should read -- $R_XSiHCl_{3-x}$ --; line 9, the formula " $R_XSi(OR')Cl_{31X}$ " should read -- $R_XSi(OR')Cl_{3-x}$ --; line 10, two occurrences, "A1H" as printed, should read --AlH--, where the middle character is the letter "el" and not the numeral "1".

Signed and sealed this 3rd day of July 1973.

(SEAL)
Attest:

EDWARD M. FLETCHER, JR.
Attesting Officer

Rene Tegtmeyer
Acting Commissioner of Patents